3,024,760
SOUND DEVICE SIGNALLING THE BEGINNING OF THE EXHAUSTION OF A LIQUID GAS BOTTLE

Giovanni Enrico, Genoa, Italy, assignor to Mizar Handels-Anstalt, Schaan, Liechtenstein
Filed Dec. 29, 1959, Ser. No. 862,672
Claims priority, application Italy Jan. 5, 1959
2 Claims. (Cl. 116—109)

This invention relates to signalling means and more particularly to signalling means for signalling when liquid in a liquid gas container or bottle is nearly exhausted.

Usually a bottle of liquid gas exhausts suddenly without any previous indication.

The present invention has for its object a percussion sound signal device for signalling when the level of the liquid inside a container reaches and falls below a preselected warning level.

The sound device is mounted in an openable top outlet of the bottle, sounding a signal when the level of the liquid inside the bottle falls below a desired level, and positive means are provided for preventing the sounding of the warning signal until the liquid reaches the preselected low level.

Features of the device according to the invention comprise a hollow body having a substantially cylindrical shape, and an inverted bell element mounted in said hollow body and defining an inverted bell-shaped passageway with a valve seat at one end of the passageway in which a small ball rests for closing the passageway.

A rod is arranged to displace the ball from its valve seat until the liquid level reaches the predetermined low level. The rod is guided through apertures provided in two spaced transverse elements, and provided with a thickening or the like with a larger cross section than the apertures to limit its vertical movement.

A float element to which the rod is attached, optionally placed inside a protective tubular guide extending from near the bottom of the bottle, and being open at its lower end to communicate with liquid in which it may be immersed.

Other objects and features and a full understanding of the invention may be had by referring to the following description and claims, taken in conjunction with the accompanying drawings, in which:

Figures 1, 2:
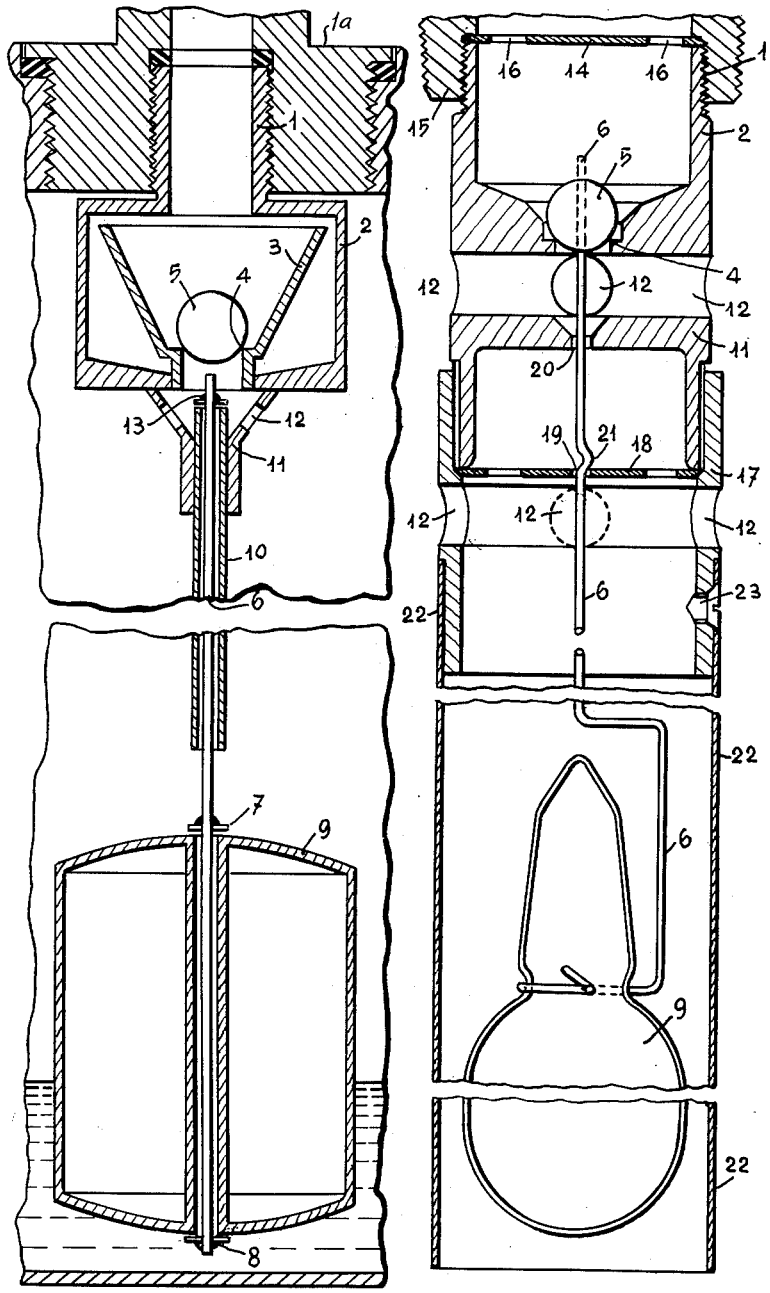
FIG. 1 is a vertical section of the invention in the normally installed position for signalling in the top outlet defined by a portion of a bottle.
FIG. 2 is a vertical cross section of another embodiment of the invention.

With reference to FIG. 1, a threaded element connects the device in the top outlet of a bottle 1a (partially shown). A hollow body 2 is integral with the threaded element 1, and inside said body there is an inverted bell element 3 defining a passageway and provided in its narrower portion with a seat 4 for receiving a small ball 5, preferably of steel. A rod 6 is secured by an end with the nuts 7 and 8 to a float element 9, which is adapted to float on liquid gas. The rod has a length relative to the height of the bottle for the rod free end to contact and raise the ball 5 from its seat for all levels of the liquid gas in the bottle above a low preselected warning level. The rod is guided by a pipe 10 whose upper end is connected to the wall 11 defining apertures 12 in the bottom of the hollow body 2; a nut 13 mounted adjacent upper end of the rod and positioned thereon to engage the upper end of the pipe 10 a short distance after the float reaches the preselected warning level thereby avoiding a useless further lowering of the float 9 and the rod 6.

The device works as follows. When the level of the liquid inside the bottle is above the value at which the sound signal is desired, the ball 5 is raised from its seat by the rod 6 attached to the floating element of which floats on the liquid in the bottle and the gas passes freely through the aperture defined by the ball seat, the ball seat being agitated by the passing gas to act as a striking element or bell clapper in the bell shaped passageway. When the level of the liquid reaches the value at which the sound signal is desired, the floating element 9 and the rod 6 have moved downward, allowing the ball 5 to rest on its seat 4. In this position the gas passing through the openings 12 blows the ball 5 to agitate it in and out of the seat 4 thereby causing the ball to strike the bell element to sounding warning signals.

The stape and position of the bells 3 is such that, when the bottle is inclined, the ball 5 moves away from its seat 4 leaving a free passage for the filling on the bottle. Similarly the ball 5 moves away from its seat 4 when the bottle is completely turned upside down for the discharge of possible liquid residuals.

With reference to FIG. 2, numerals 2 through 11 denote elements corresponding to those of FIG. 1. Two hollow portions 2 and 11 are symmetrical and placed with their bottoms opposed and connected; a cover 14 having spaced openings 16 is placed between the hollow body 2 and the body of the output cock 15 (partially shown) of the bottle. The openings 16 provided in the cover 14 have smaller diameters than the ball 5; a connection sleeve 17 has apertures 12 in the side walls between the ends; cover 18 similar to the cover 14 is placed between the hollow body 11 and the sleeve 17. The cover 18 has an additional center aperture 19 for the passage and guidance of rod 6 therethrough. An aperture 20 is provided in the bottom of the hollow body 11 serving for the passage and guidance of the rod 6. The rod 6 has a crimp 21 larger than the apertures 19 and 20 which limits the stroke of the rod. A protection and guide pipe 22, open at the lower end, surrounds the floating element 9 and is recessed into the lower end of the connection sleeve 17. A connection screw 23 extending between the protection pipe 22 and the connection sleeve 17 holds them together.

The second embodiment of the invention illustrated by FIG. 2 operates similarly to the one already described and illustrated by FIG. 1. However the device of FIG. 2 has the advantage of providing for an easier filling of the bottle. The holes 16 defined by the cover 14 provides a bleeder hole for the gas and causes whirls in the flow of the liquid which avoid reseating the ball 5 which has been tilted therefrom to open the passage into the bottle.

Although the present invention has been described with particularity, the disclosure has only been made by way of example and many modifications and changes may be made without departing from the scope and spirit of the invention as hereinafter claimed.

What I claim and desire to secure by Letters Patent is:

1. A warning percussion sound device for use in a closed pressure bottle, having a top outlet for the exit of gas, said bottle containing liquid under pressure which evaporates into gas when said top outlet is open for said gas to pass therethrough, said warning device for signalling when the liquid in said bottle falls to and below a preselected level and comprising: a hollow body having opposite ends with a bored hole in one end for the entrance of gas therein, and bored projecting element for the exit of gas therefrom on the other end; a bell element mounted inverted in the hollow body and defining a vertical bell-shaped passageway having oppositely disposed unequal open ends; the smaller of said open ends defining an interior circular valve seat and being mounted congruent with the bore hole in said hollow body, said hollow body being secured in the top outlet of said bottle by said bored projections with the larger of said open ends of said bell shaped passageway uppermost, ball shaped percussion means adapted to fit said valve seat to close said passageway when positioned therein by gravity, said ball percussion means being blown by said passing gas from said valve seat, to strike against said bell element to give a percussion signal and roll back to said seat by gravity and to continuously repeat this thereby producing a rapid succession of percussion signals; and disabling means for floating on said liquid and slidably mounted and extending through said bored hole in said hollow body and into said passageway to hold said ball percussion means clear of said valve seat when the liquid in said bottle is above the preselected level.

2. A warning sound device as described in claim 1 and characterized in that said disabling means comprises; a float means for floating on the liquid in the bottle, rod means rigidly attached by an end to said float means and extending upward a distance to just touch said spherical percussion signal means resting on said valve seat when said float means is floating at said preselected level, fixed guide means mounted adjacent said ball seat aperture for guiding said rod means into said smaller end of said bell shaped passageway, whereby said float means when above the preselected level lifts said rod means to prevent said spherical percussion signal means from returning to said valve seat and thereby breaking said cycle of producing said percussion signals, said ball which thereby remains unagitated to leave the bell unstruck and the signal means disabled.

References Cited in the file of this patent

UNITED STATES PATENTS

| | | |
|---|---|---|
| 1,284,920 | Nielson | Nov. 12, 1918 |
| 1,371,365 | Grah | Mar. 15, 1921 |
| 1,381,299 | Grah | June 14, 1921 |
| 2,143,340 | Willits | Jan. 10, 1939 |
| 2,233,229 | Tapps | Feb. 25, 1941 |
| 2,539,281 | Smith | Jan. 23, 1951 |